(12) United States Patent
Crabtree et al.

(10) Patent No.: US 7,512,678 B2
(45) Date of Patent: Mar. 31, 2009

(54) INFORMATION PROVIDER

(75) Inventors: Ian B Crabtree, Ipswich (GB);
Alexander Loffler, Ipswich (GB);
Matthew J Polaine, Cambridge (GB);
John J O'Donoghue, Ipswich (GB);
Jeremy M Bowskill, Ipswich (GB);
Richard J Titmuss, Ipswich (GB)

(73) Assignee: British Telecommunications public limited company, London (GB)

( * ) Notice: Subject to any disclaimer, the term of this patent is extended or adjusted under 35 U.S.C. 154(b) by 868 days.

(21) Appl. No.: 10/399,976

(22) PCT Filed: Nov. 16, 2001

(86) PCT No.: PCT/GB01/05074

§ 371 (c)(1),
(2), (4) Date: Apr. 24, 2003

(87) PCT Pub. No.: WO02/41178

PCT Pub. Date: May 23, 2002

(65) Prior Publication Data

US 2004/0044658 A1 Mar. 4, 2004

(30) Foreign Application Priority Data

Nov. 20, 2000 (EP) ................................... 00310267
Nov. 20, 2000 (EP) ................................... 00310269
Nov. 21, 2000 (EP) ................................... 00310323

(51) Int. Cl.
*G06F 15/16* (2006.01)

(52) U.S. Cl. ..................... 709/224; 709/203; 709/231; 709/232; 707/3; 707/5; 707/10

(58) Field of Classification Search ................. 709/203, 709/224, 231, 232; 707/3, 5, 10
See application file for complete search history.

(56) References Cited

U.S. PATENT DOCUMENTS 5,446,891 A 8/1995 Kaplan et al.

(Continued)

FOREIGN PATENT DOCUMENTS

EP 0786728 A1 7/1997

(Continued)

OTHER PUBLICATIONS

Schmidt et al., "There is more to Context than Location", Computers and Graphics, Pergamon Press Ltd., Oxford, GB, vol. 23, No. 6, Dec. 1999, pp. 893-901, XP004187838.

(Continued)

*Primary Examiner*—Jinsong Hu
(74) *Attorney, Agent, or Firm*—Nixon & Vanderhye, P.C.

(57) ABSTRACT

Information sources are selected in accordance with a subject matter of interest to a user, where the subject matter of interest is identifiable by a plurality of sets of subject-related data, and each set has an indication of at least one context in which the set is of interest to the user. The state of the user is tracked, one or more contexts are identified from the tracked state, at least some sets of subject-related data are selected in accordance with a predetermined relationship between at least some of the identified contexts and said indication of context, a list of information sources is generated based on the selected sets of subject-related data, and the list is transmitted to a terminal associated with the user so as to allow the user to select an information source of interest and thereby to access information from the source.

28 Claims, 7 Drawing Sheets

U.S. PATENT DOCUMENTS

| | | | |
|---|---|---|---|
| 5,710,884 A | | 1/1998 | Dedrick |
| 5,761,662 A | | 6/1998 | Dasan |
| 5,893,091 A | | 4/1999 | Hunt et al. |
| 5,931,907 A | | 8/1999 | Davies et al. |
| 6,018,733 A | * | 1/2000 | Kirsch et al. .................. 707/3 |
| 6,041,311 A | | 3/2000 | Chislenko et al. |
| 6,047,327 A | * | 4/2000 | Tso et al. .................... 709/232 |
| 6,076,166 A | | 6/2000 | Moshfeghi et al. |
| 6,289,337 B1 | | 9/2001 | Davies et al. |
| 6,321,228 B1 | * | 11/2001 | Crandall et al. ............... 707/10 |
| 6,324,274 B1 | | 11/2001 | Akester et al. |
| 6,397,212 B1 | * | 5/2002 | Biffar ............................ 707/5 |
| 6,493,702 B1 | * | 12/2002 | Adar et al. ..................... 707/3 |
| 6,601,103 B1 | * | 7/2003 | Goldschmidt Iki et al. .. 709/231 |
| 6,658,415 B1 | * | 12/2003 | Brown et al. .................. 707/10 |
| 6,701,362 B1 | * | 3/2004 | Subramonian et al. ...... 709/224 |
| 6,842,774 B1 | * | 1/2005 | Piccioni ....................... 709/207 |
| 2001/0008404 A1 | | 7/2001 | Naito |
| 2002/0069223 A1 | * | 6/2002 | Goodisman et al. ......... 707/513 |
| 2004/0039814 A1 | | 2/2004 | Crabtree et al. |
| 2004/0049537 A1 | | 3/2004 | Titmuss |

FOREIGN PATENT DOCUMENTS

| | | |
|---|---|---|
| EP | 0 944 002 | 9/1999 |
| EP | 1045318 A1 | 10/2000 |
| JP | 2000-99486 | 9/1998 |
| JP | 10-283403 A | 10/1998 |
| JP | 2000-148769 | 11/1998 |
| JP | 2000-99486 A | 4/2000 |
| JP | 2000-148769 A | 5/2000 |
| JP | 2000-99441 | 7/2000 |

OTHER PUBLICATIONS

Rekimoto et al., "Augment-able Reality:Situated Communication Through Physical and Digital Spaces", Wearable Computers, 1998, Digest of Papers, Second International Symposium on Pittsburgh, PA, USA Oct. 19-20, 1998, Los Alamitos, CA, USA, IEEE Comput. Soc., US, Oct. 19, 1998, pp. 68-75, XP010312817.

Mobile Phone Using User-Defined, Location-Dependent Profiles, Research Disclosure, Kenneth Mason Publications, Hampshire, GB, No. 438, Oct. 2000, p. 1733, XP000994120.

Eleftheriadis et al., "User Profile Indentifcation in Future Mobile Telecommunications Systems", IEEE Network, IEEE Inc., New York, US, vol. 8, No. 5, Sep. 1, 1994, pp. 33-39, XP000606584.

Quintana, "Knowledge-Based Information Filtering of Financial Information", Proceedings of the National Online Meeting, XX, XX, May 13, 1997, pp. 279-285, XP002057953.

Kurzke et al., "WebAssist: A User Profile Specific Information Retrieval Assistant", Computer Networks and ISDN Systems, North Holland Publishing, Amsterdam, NL, vol. 30, No. 1-7, Apr. 1, 1998, pp. 654-655, XP004121364.

Freytag et al., "Resource Adaptive WWW Access for Mobile Applications", Computers and Graphics, Pergamon Press Ltd., Oxford, GB, vol. 23, No. 6, Dec. 1999, pp. 841-848, XP004187832.

Japanese Office Action dated Mar. 6, 2007 (English translation).

* cited by examiner

INFORMATION PROVIDER

RELATED APPLICATIONS

This application is related to copending commonly assigned applications Ser. No. 10/399,974, filed Apr. 24, 2003 and Ser. No. 10/399,977, filed Apr. 24, 2003.

This application is the US national phase of international application PCT/GB01/05074 filed Nov. 16, 2001 which designated the U.S.

BACKGROUND

1. Technical Field

The present invention relates to a system for providing information to a user, particularly providing information relevant to a context of the user.

2. Related Art

In the current information rich climate, a considerable amount of attention is being paid to develop improved methods of information retrieval. In particular, the field of agent technology is heavily involved in developing agents for searching, summarisation, filtering and presentation of information e.g. Davies, Weeks & Revett, 1997 ("Information Agents for the WWW" in Software agents and soft computing, Eds H. Nwana, N. Azarmi, Berlin Springer-Verlag). Most, if not all, of these rely on the agent having some knowledge of the user. The inclusion of user information is rapidly becoming a key area, not only for agent technology, but also for the Internet in general, as demonstrated by the recently proposed Open Profiling Standard Dunn, Gwertzman, Layman & Partovi 1997 ("Privacy and profiling on the web" Technical note, WWW consortium Jun. 2, 1997). User information is undoubtedly playing an ever-increasing role as digital libraries, electronic commerce, and personalised applications become more widespread.

Filtering agents (such as email prioritising agents) were typically the first generation of agents to be concerned with managing volumes of information. Maes 1994 describes the various motivations, methods and applications of such agents for reducing information overload (Maes (1994) "Agents that reduce workload and information overload" Communications of the ACM, July). Indeed, this is perhaps the single most important reason that agents have succeeded within the Internet environment: there are simply too many resources available for any one person to consult exhaustively, and indeed if one were fortunate enough to have browsed all these pages, one would probably find that only a small percentage were actually of any interest or relevance. Search agents (such as Amalthaea) are becoming increasingly prominent as a means to reduce this workload, with most including some method of allowing the user to inform the agent of their interests and preferences. Further developments within agent technology have begun to consider previous interactions with a user as well as learning their interests.

Many recent agents include some form of user profiling, such as

Yenta (Foner & Crabtree, 1997 ("Multi-agent matchmaking" in Software agents and soft computing, Eds H. Nwana, N. Azarmi, Berlin Springer-Verlag)), Syskill & Webert (Pazzani and Billsus, 1997 "Learning and revising user profiles: the identification of interesting web sites", Machine learning 27 (3)), Personal WebWatcher (Mladenic, 1996 "Personal webwatcher: design and implementation", Technical report Ijs-DP-7472, School of computer science, Carnegie-Mellon University, Pittsburgh USA, October.), Letizia (Lieberman. 1995 "Letizia: An agent that assists web browsing", Proceedings, $14^{th}$ Joint International Conference on artificial intelligence (IJDAI-95), Montreal, Canada), NewsSIEVE (Haneke, 1997 "Learning based filtering of text information using simple interest profiles", In P. Kandzia & M. Klusch, Co-operative information agents. Berlin: Springer-Verlag"), and INSOP (Kindo et al 1997 "Adaptive personal information filtering system that organizes personal profiles automatically", Proceedings $15^{th}$ International Joint Conference on Artificial Intelligence (IJCAI-97) pp. 716-721 Nagoya, Japan).

The agent of Syskill & Webert learns a user's profile and uses this to guide its suggestions for interesting web pages. The user rates the relevance of the suggestions to the user's interest and the agent employs a naive Bayesian classifier to revise the user profile accordingly. Amalthaea (Moukas, 1997 "User modelling in a multiagent evolving system" Proceedings, workshop on Machine learning for user modelling, $6^{th}$ International Conference on User modelling, Chia Laguna, Sardinia) employs a weighted keyword representation for a user's profile, which is then consulted in order to query Internet search engines in order to retrieve pages of interest to a user. Amalthaea's user profile comprises a number of information filtering agents (IFAs), each one specialised for a particular topic. These IFAs can be constructed in a number of ways (e.g. through analysis of a user's hotlist of favourite web pages; through observation of the user's interaction with their browser (using page access history logs) etc.) Furthermore the IFAs can evolve over time, so that they can adapt more closely to the user as the user interacts with Amalthaea over time.

Many web sites collect information about a user in order to a) keep track of demographic information, b) provide personalised services and information from the site. This technique is becoming more important for sites to be able to maintain a loyal customer base. Indeed Firefly, Autonomy and OpenSesame! have all recently announced products which will enable such adaption.

It is therefore clear that having a profile of a user is crucial in order to provide services and information of interest to the user. Although the systems described above use a variety of techniques and information sources, not many systems attempt to arrange the keywords, or identifiers in the profile, as a function of the context of a user. The context of a user at a moment in time largely determines the type and content of information that is of interest to the user at that moment in time (e.g. if a user is working then the user is likely to want to know about work related interests) and developments in this area could assist in reducing the volume of information that is presented to a user.

The Applicant's patent EP807291 (U.S. Pat. Nos. 5,931, 907 and 6,289,337) teaches a software-based system known as the "JASPER" agent, which stores meta-information, such as URL of the document and keywords indicative of the content of the document, relating to documents of interest to a user. JASPER also stores user profiles comprising keywords that indicate the interests of users in particular types of information, and performs collaborative filtering between users to identify users that may have overlapping interests (arranging users into groups). JASPER compares the meta-information between groups of users, and, if one user in group A has identified a document as being relevant to him, JASPER passes the meta-information relating to the identified document to other users in group A (e.g. via email). The user profile can be arranged to store keywords in categories, as a function of context (e.g. types of work, leisure), and JASPER can change the content of those categories in accordance with detected changes in information type viewed by the user (e.g. performing a comparison between keywords stored in respect of one context and comparing that to the keywords in documents being viewed). JASPER is thus concerned with identifying a set of keywords that characterise context, for the purposes of information delivery and identification between groups of users.

Schmidt A et al, in "There is more to context than location" Computers and Graphics, Pergamon Press Ltd. Oxford, GB, vol. 23, No. 6, December 1999 (1999-12), pages 893-901, XP004187838 ISSN: 0097-8493, describes identifying extrinsic conditions associated with a user, Schmidt describes using inputs from different types of sensors to improve context identification, and uses the context information to improve selection of display characteristics and dialogue status (such as interruptability) for mobile users reliant on receiving data via mobile devices.

BRIEF SUMMARY

In the following description, the terms "interest", "user profile", "information source", "context", "instantiated interest" are used and are defined as follows:

"interest" includes subject-related data such as a set of keywords and/or images and/or music that are representative of a subject. Commonly images and music are accompanied by some form of description e.g. for music "Faure Requiem, written in 1887, the piece reflects Faure's vision of death". In this case, keywords could be extracted from the description, and used to describe an interest (e.g. for the subject Impressionist, Death).

"user profile" includes one or more interests stored in respect of a user.

"information source" includes an entity that contains information, e.g. a document.

"context" includes representations that describe the current status of a user—e.g. state (work, play), situation (home, away) and company (colleagues).

"instantiated interests" when the status of the user has been identified, the context of the user is instantiated—e.g. the user is identified to be working at home, so the context is instantiated to work, home. Interests are then filtered according to the instantiated context and these interests are referred to as instantiated interests.

According to a first aspect of the present invention there is provided a method of selecting information sources in accordance with a subject matter of relevance to a user, the subject matter being identifiable by a plurality of sets of subject-related data, each set having an indication of at least one context in which the set is relevant to the user, the method comprising (i) receiving schedule information and data in respect of at least one environmental condition associated with the user so us to identify a user context, (ii) searching the sets of subject-related data in accordance with a predetermined relationship between the identified user context and said indication of context so as to select subject-related data relevant to the identified user context, (iii) generating a list of information sources based on the selected sets at subject-related data, and (iv) transmitting said list to a terminal associated with said user so as to allow said user to select an information source and thereby to access information from said source.

The predetermined relationship between at least some of the identified contexts and said indication of context includes a correspondence therebetween, which, in one embodiment, means that the identified user context is the same as the indication of context assigned to sets of subject-related data.

Known systems utilise a plurality of static "user profiles", from which the system can select as a function of the user's location. This is substantially different to embodiments of the present invention, where a profile, comprising the sets of subject-related data, is essentially generated "dynamically", based on the user's identified context. Embodiments of the invention have the advantage of a reduced amount of duplication: it is likely that an interest could be relevant to a number of contexts (swimming for example might cover 'home', 'play', 'weekend' and even 'work'). If there were 'n' profiles the system has to replicate each interest into each context where it was relevant. In embodiments of the invention there is only one "profile", and relevance of each interest on the profile to the current context or to a context of interest, is computed. The relevance of the interest to the context is used to either a) decide whether the interest should be used to gather information for this context or b) used to weight the information returned.

This weighting of information enables information to be ranked as a function of the computed relevance. Thus, in a user's home context, swimming may be considered highly relevant to the user, and information relating to the interest swimming is thus pushed to the top of the list. Conversely, in a work context, swimming may not be considered relevant at all, so that the swimming information would be pushed to be bottom of the list.

The tracking step (ii) includes the steps of:

tracking the location of a user by receipt of tracking information for the user, and comparing the tracking information with predetermined location information in accordance with predetermined criteria, the predetermined location information defining at least a "home" context and a "work" context, and the predetermined criteria including conditions between the tracking information and the predetermined location information.

Preferably the tracking step (ii) further includes receiving schedule information for the user from a temporal schedule, and the predetermined criteria used in the comparing step further includes conditions relating to schedule information. In addition, the tracking step (ii) may include receiving inputs from at least one of a position detector, an acceleration detector, stress detecting means, a temperature detector, light level detecting means.

According to a second aspect of the invention there is provided a method of retrieving information in respect of subject matter of interest to a user on the basis of a state of the user, and of presenting the retrieved information to the user via a terminal, where the presentation of information includes creating a viewable page comprising at least some of the retrieved information. The method includes the steps of:

(i) selecting information sources according to the method described above, (ii) organising the retrieved information in accordance with predetermined criteria, at least one of which includes a state of the user, and (iii) storing the organised information, such that when a viewable page is created, a selection of said stored information is retrieved in accordance with display capabilities of the terminal.

BRIEF DESCRIPTION OF THE DRAWINGS

Further aspects, features and advantages of the present invention will be apparent from the following description of preferred embodiments of the invention, which refers to the accompanying drawings, in which.

DETAILED DESCRIPTION OF EXEMPLARY EMBODIMENTS

Overview

Figure 1:
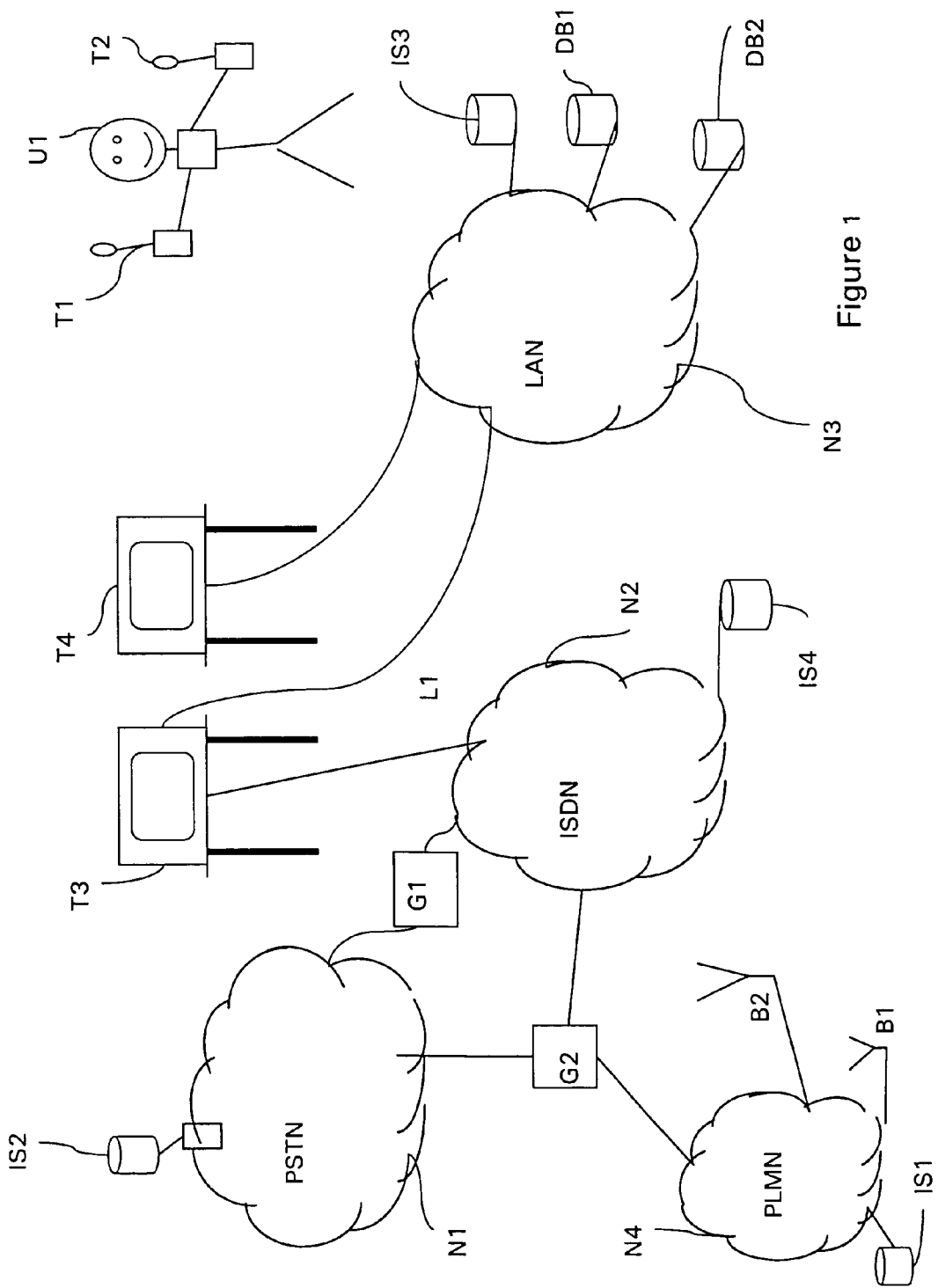
FIG. 1 is a schematic diagram illustrating the physical, or transport, layer of a communications system according to the invention.

Referring to FIG. 1, at the physical level the communications environment of a user U1 includes a cellular telephone T1 and a personal digital assistant T2 carried by the user; and a computer workstation T3 including a modem. The workstation T3 is most likely to be located some distance away from the user U1.

The workstation T3 in this case comprises a local area network (LAN) server, connected to further terminals (only one shown T4) at different distances from the user. In communication with the various terminals are a number of different communications channels forming parts of different notional networks (although some or all may be commonly owned). The workstation T3 is also connected to database servers DB1, DB2, shown on the same LAN N3 as the terminal T3; it is understood that the database servers DB1, DB2 could be located on LANs that are connected to LAN N3 via one or more switches and/or routers (not shown).

A public switched telephone network (PSTN) N1 is interconnected with an integrated services digital network (ISDN) N2 via a gateway G1 (e.g. a local or international switching centre), and is connected via an ISDN line L1 to terminal T3, and hence to local area network N3. A public land mobile network (PLMN) (e.g. a GSM-compatible digital cellular network) N4 is connected via a gateway G2 to the PSTN N1 and ISDN N2. A base station B1 of the PLMN provides a Pico cell in the environment of the building within which the user U1 is located, and a base station B2 provides a cell within the same general area. Thus, the networks N1-N4 are capable of delivering data at different rates to the various terminals T1-T3: low speed data via the PLMN N4, higher speed data via the PSTN N1, and yet higher speed data via the ISDN N2 or LAN N3.

Information sources, held for example on servers IS1-IS4, are distributed throughout the networks N1-N4. Only four servers are shown, however other distributions are envisaged. The user U1 may wish to receive pertinent information from any or all the information sources in the system.

Overview of an Embodiment

The context of a user U1 largely determines the type and content of information that is of interest to the user U1 at a moment in time, e.g. if a user U1 is at work then the user U1 is likely to want to know about work related interests. If information is categorised and presented according to the user's context, it achieves three things: firstly the volume of information presented to the user U1 is reduced, secondly the user does not have to manually filter out information that is not relevant to his present context, and thirdly the user is not distracted by information that is not relevant to his present context. It is therefore convenient to filter information as a function of a user's context in order to reduce the volume of information that is not relevant to the user.

Figure 2:
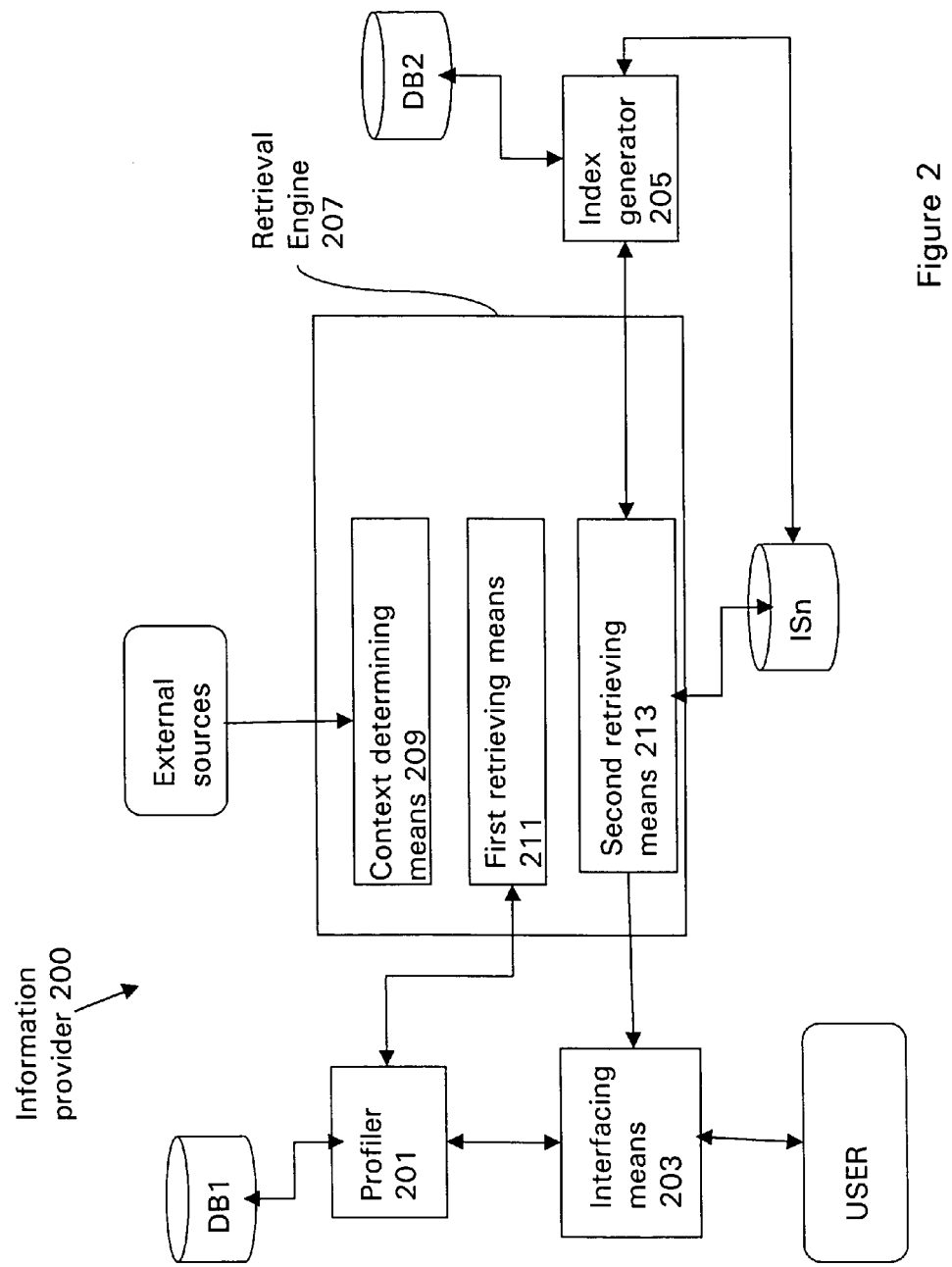
FIG. 2 is a schematic block diagram showing components of an information provider according to the present invention.

Referring to FIG. 2, an embodiment of the invention, which is generally referred to as information provider 200, is located on terminal T3. The information provider 200 essentially comprises a profiler 201 for generating a profile comprising interests of a user, interfacing means 203 for interfacing with the user, Index generator 205 for indexing information sources stored on servers IS1-IS4, and retrieval engine 207 for retrieving information in accordance with the context of a user.

The components of the information provider 200 are described in greater detail below, but in overview, the profiler 201 receives interests information from the user, via interfacing means 203, and generates a personal profile, which is stored in profile database DB1, for the user. The interests comprising the profile are accompanied by attributes, e.g. home/away, work/play, which generally describe a context of the user. The Index generator 205, as mentioned above, indexes information sources stored on servers IS1-IS4.

The retrieval engine 207 comprises context-determining means 209, first retrieving means 211 and second retrieving means 213. Context-determining means 209 receives information from external sources relating to the user U1—e.g. the location of the user, the time of day, and one or more inputs from a diary, from which the context of the user U1 is determined. The first retrieving means 211 is arranged to retrieve information from the personal profile generated by the profiler 201, such that, once the context determining means 209 has determined the context of the user, the first retrieving means 211 can retrieve interests relating to that context. The second retrieving means 213 uses the context-related interests retrieved by the first retrieving means 211 to query the index generator 205 and retrieve information sources corresponding to those queries.

Essentially, the information provider 200 receives inputs from one or more sensors and/or data inputs, and uses the inputs to determine and instantiate a context of the user. Once the context has been instantiated, interests relating to the instantiated context are identified, and information is retrieved in respect of those interests. Embodiments are operable to dynamically update and instantiate a user's context, thereby ensuring that the user automatically receives information that is appropriate to his current context.

Advantages of embodiments of the present invention include a decoupling of context from actions of a user at a terminal in order to determine context. Embodiments of the invention can determine a user's context whether or not they are logged onto a terminal, making use of inputs such as location tracking devices, diary entries, weather reports etc to determine the context. In fact context is continually monitored without requiring any explicit interaction with the user.

Further advantages include ranking of retrieved information in accordance with the determined context. For example, when information is retrieved in respect of all of the user's interests, the attribute information tagged to the user's interests in combination with the user's most recently instantiated context is used to organise the retrieved information for presentation to the user. In one embodiment a shortlist of information source summaries is created in respect of all retrieved information, and retrieved information corresponding to interests having attributes that match the most recently instantiated context are placed at the top of the shortlist.

Another advantage is the ability of embodiments to instantiate the context with future contexts, so that, for example, the user can view interests that are relevant to his weekend plans.

The following worked example illustrates the functionality and advantages of embodiments:

Assume that the user has a user profile including the following sets of interests:
Mobile Internet (Work)
WAP (Work, Play)
Venture Capitalists (Work)
Motorised transport (Work, Home)
Television listings (Home, Play)
Birdwatching (Play)
Eating out (expensive food) (Play)
Football-Startreck United (Play)
Tattingstone White Horse (Play, Home)

At 08:00, while en route for work, the user U1 receives an SMS alert informing him of local traffic delays around Martlesham. The user ignores the report, continues to work and gets stuck in a traffic jam. Bored, the user U1 decides to look at the news available from the information provider 200 on his WAP phone. The user scrolls through the shortlist delivered by second retrieving means 213 and marks those interests that he wants to read later. By default the user U1 was shown work-related interests, because context-determining means 209 had determined the user's context to be work. However, there are links to Leisure-related interests.

The user U1 has a meeting scheduled with a Venture Capitalist for 09:00. The user U1 has set a high preference value for information relating to the Venture Capitalist interest, so the shortlist includes information relating to Venture Capitalist at the top of the list. Fortunately a description of a news article relating to Venture Capitalists appears on the shortlist, and the user U1 is able to view the article prior to his 09:00 meeting.

Later in the day, while at his desk and a little bored, the user U1 starts thinking about his evening activities. The user U1 changes the context to the Play/Home context, and is presented with a shortlist of items including TV programmes for that evening, news about his football team, and notice of the next Bird watching convention.

At the weekend, the user U1 visits Norwich. From the user's banking details, the profiler 201 has included an interest in locations of NatWest cash machines, and from the user's motorised transport interest, the profiler 201 has included an interest in locations of petrol stations. Both of these implied interests are appended with all contexts (so in this embodiment Work, Home, Play, Away). The context determining means 209 determines that the context of the user is Away and Play, and, based on the user's determined location by tracking device, the second retrieving means 213 retrieves information detailing the location of expensive restaurants, NatWest cash points and petrol stations around Norwich.

Profiler 201

The information provider 200 has a predetermined, finite number of interests from which interests associated with a user U1 can be selected. These interests fall within the following non-exhaustive list of categories:
  General interests: e.g. current affairs, finance, home, business, leisure, hobbies, clubs etc.;
  Places: e.g. home town, holiday destination, business trip, family homes etc.

There is a "master copy" of general interests, which are interconnected via connectors as an acyclic graph. The master copy is stored in a database table in the profile database DB1. Each of the interests (of type general or location) has one or more predefined keywords that are associated with the interest, and these keywords are also stored within the profile database DB1, linked to their respective interest. (The keywords are used for retrieval of information relevant to the user, as described in more detail later). Each interest has a unique identifier (ID), and the connectors in the acyclic graph link interests together (so that the inclusion of keywords for an interest is at least partly dependent on which other interests are linked to that interest such that, for example, interest I1 inherits a predetermined number of keywords from its parent and child interests).

The profiler 201 is arranged to receive interest information from the user and to generate a profile that comprises the user's interests and keywords relating to those interests. The profiler 201 can also implicitly identify interests in accordance with predefined rules.

Explicit Modification of Profile:

A user can explicitly input words and/or phrases that are representative of the user's interests, whereupon the profiler 201 attempts to find interests within the master copy that match the input. This involves searching through the acyclic graph for a match between the input and the interests, possibly using WORDNET, a lexical reference system, or similar, to broaden the search. If the profiler 201 cannot locate an interest that matches the input, the user U1 can navigate through the interests and select interests manually.

The profiler 201 can additionally co-operate with a parser (not shown) in order to translate the entered keywords and/or phrases into one or more predetermined interests; many known systems could be adapted to parse input and translate the parsed input into a format understood by the profiler 201.

In addition, users can access their profile at all times. Thus a user is able to view their profile, view their instantiated context, make changes directly to their profile, and indeed to the information sources used to retrieve information in respect of the interests in the profile.

Implicit Modification of Profile:

The profiler 201 can include one or more rules that interrelate interests, such that if interest A is linked with interest B and a user U1 has interest A, then the profiler 201 will automatically include interest B in the user's profile. Rules can also be based on information retrieved by the profiler 201 from other users and/or external sources.

The latter can be particularly useful for providing service-related information to users—e.g. if one of the information sources IS1-IS4 includes information relating to banks, the information provider 200 has the potential to deliver bank-related information to a user. However, in order to deliver bank-related information that is relevant to the user, the information provider 200 needs to know which bank the user U1 has an account with. Clearly the user U1 could explicitly enter this information, but it would be far more convenient to the user U1 if this information could be retrieved without having to involve the user U1 directly. To this end the profiler 201 can be further arranged to co-operate with web browsers (not shown), one located on each terminal T1, T2, T4 used by the user U1. In particular the profiler 201 could download software, for website tracking, on the hard disk drive of the terminal(s) T1, T2, T4. Assuming the user U1 banks "online", the URL of the user's bank could be accessible to the downloaded software, and from this the profiler 201 can retrieve the name of the bank, and add this to the user profile in the profile database DB1. Alternatively, if the profiler 201 has access to billing information in respect of third party services and/or systems used by the user, the profiler 201 can be arranged to request bank details from the billing system relating to the third party. The third party system could be located on one of the networks N1-N4.

The user U1 can override any interests that have been inferred implicitly.

The profiler 201 is arranged to tag a context type to each interest. In one embodiment, two categories of context are described, namely state and situation. In their simplest forms, these context categories have two types: state context has work and play, and situation context has home and away. Other embodiments can include different types of contexts, such as friends/family; solo/group; indoor/outdoor; rainy/sunny; windy/calm; daytime/nighttime; static/on the move weekday/weekend etc. The skilled person would appreciate that other contexts are possible.

For each category of context, some interests may be tagged with both types of contexts—e.g. user U1 may be interested in computers for Work and Play purposes. The context type can be entered explicitly or implicitly, and each interest can be tagged with a default context type.

One way of expressing the degree of relevance between a context and an interest is to weight the contexts, for example with a value between −1 and +1. This weighting value indicates how important a context is to an interest. For the current embodiment, all contexts are expressed as pairs—e.g. work/play, and a weighting of −1 indicates weighting towards work type and +1 indicates weighting towards play type:

TABLE 1

| Context | Interest | |
|---|---|---|
| | Football | Sailing |
| work/play | 0.7 (i.e. play is more relevant to football than work is) | 0.7 (i.e. play is more relevant to sailing than work is) |
| home/away | 0.0 (i.e. home and away are equally relevant to football) | 0.7 (i.e. away is more relevant sailing than home is) |
| solo/group | 0.4 (i.e. group is more relevant to football than solo is) | −0.4 (i.e. solo is more relevant to sailing than group is) |
| rainy/sunny | 0.2 (i.e. sunny conditions are slightly more relevant to football than rainy conditions are) | 0.0 (i.e. rainy and sunny conditions are equally relevant to sailing) |
| windy/calm | 0.1 (i.e. calm conditions are slightly more relevant to football than windy conditions are) | −0.8 (i.e. windy conditions are more relevant to sailing than calm conditions are) |

Each interest can be associated with an "interest context object", which essentially comprises values for the contexts shown in Table 1. When, as is described in detail below, the context(s) of a user is/are identified, a "user context object" can be created, which describes the current identified context of the user (e.g. if the user is identified as being at home, and working, his context object will comprise: work/play=−1.0; home/away=−1.0). This user context object is then matched against the interest context objects and used to identify one or more interests having weights that match the weights of the user context object.

Storage of Profile

When an interest is selected for a user U1, the profiler 201 enters an identifier corresponding to the ID of that interest, together with the position of that interest in the tree hierarchy, into a database table for the user U1. The processes involved in storing data in, performing queries on and receiving data from, databases are known to those with ordinary skill in the art of database administration. For place names interests, e.g. place names in the UK, there is a "master copy" of place names, each of which is accompanied by county information, and an interest in respect of a place name is dynamically created using country/county/place retrieved from the master copy.

Interests can additionally be stored with attributes such as stock value and location. Setting the stock value attribute indicates that the user U1 is interested in stock values in respect of a particular interest (e.g. interest may be a company). Setting the location attribute indicates that the user U1 is interested in location information relating to an interest (e.g. interest may be banks, so that specifying a location attribute, such as Bognor Regis, refines the interest to banks in Bognor Regis). Other attributes include expertise, privacy, relevance weightings, priority weightings, times, days, volume of information, delivery channels, layout, quality of information sources, and bookmarks. There are default settings for each of the attributes, but the user U1 can change any of these settings via interfacing means 203 (described below).

The profiler 201 can also "push" questions out to the user U1—e.g. to suggest interests to the user in accordance with predetermined rules. The predetermined rules include implicit profiling information, changes in the interest acyclic graph, information from the system administrator, and feedback from the user U1. The profiler 201 monitors the user's response to the questions, and modifies the rules in accordance with the response.

Figure 3:
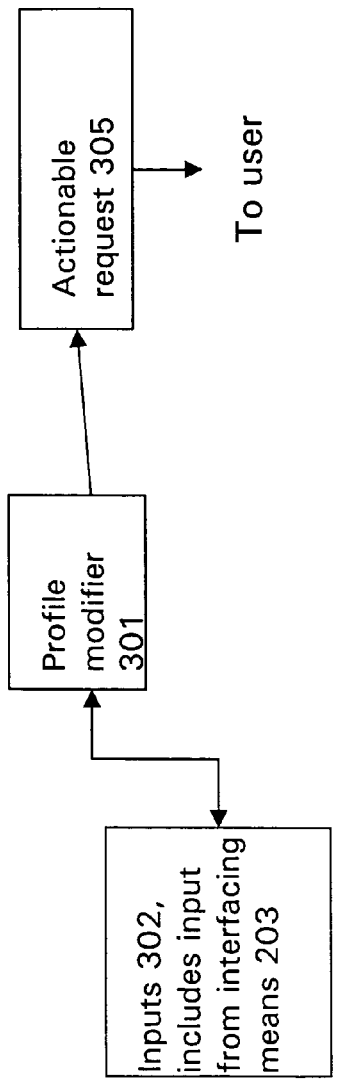
FIG. 3 is a schematic block diagram showing means for generating actions by a profiler forming part of the apparatus of the information provider shown in FIG. 2.

Referring to FIG. 3, the profiler 201 therefore additionally comprises profile modifier 301 for receiving information from a variety of inputs 302 (e.g. output of collaborative filtering, changes to system interests etc., or feedback from the user U1) and creating actions 305 based on these inputs 302. The inputs may be accompanied by conditions such as time to push information to the user U1, priority status relating to type of interests etc. The profile modifier 301 has access to a predetermined list of functions, and based on the nature of the input 302 and corresponding conditions, selects one of the functions to create an action 305. The functions stored in the list include "user interaction functions", which include the functionality to activate suggestions and questions to prompt the user U1 with (qualified by question type), and "system functions" in respect of interests, which include the functionality to add new interests, delete referred interests, modify referred interests etc. The "user interaction functions" include pushing information to the user via interfacing means 203, and can be tagged with question type, including "on trial", and "revert to original settings" etc., and delivered to the user in accordance with the priority of the request. The "system functions." include effecting a change to a stored user's profile. This further functionality of the profiler 201 is illustrated in the following example:

An interest I1 is passed to the profile modifier 301 as a result of collaborative filtering of interests between users. The profile modifier 301 creates a suggestion action 305, the suggestion being that new interest I1 should be added to the user's profile, and, because the interest is a new interest, profile modifier 301 assigns a condition of low priority to the suggestion. The suggestion action 305 is then pushed to the user U1. Typically a new interest will also be tagged with "on trial", such that the message pushed to the user U1 reads:

"We think that you may be interested in adding a new interest I1 to your profile.

This will have the effect of returning stories like Story1, Story2, Story3

Would you like to add I1 to your profile? Please answer Yes, No, I'll try it for a week"

Profile modifier 301 is also operable to receive responses from the user U1. If the user selects the option "I'll try it for a week", a message is sent to the profile modifier 301, which identifies the type of feedback, stores the message and creates a timer condition in respect of an action to prompt for some user feedback. Once the timer has expired, profile modifier 301 generates a feedback action 305 for feedback, kills the timer and deletes the message from the profile modifier 301. The message pushed to the user reads:

"Last week RF suggested the addition of interest I1 to your profile.

Would you like to keep this change?

Please answer Yes or No (If you answer No you will revert back to your original settings)"

The feedback from the user U1 is received by profile modifier 301, which identifies the type of feedback. If the feedback includes making a change to the user profile, a system action 305 is generated based on the system functions and the profile is modified as described above.

Other inputs 302 include system administrator inputs— e.g. the user U1 should be questioned in respect of the make of car that the user U1 drives.

The profile modifier 301 further includes means for storing feedback (not shown) from the user U1, in particular maintaining lists of interests in which the user U1 is not interested (on a list of deleted interests). Thus whenever an input 302 is received in respect of a new interest, profile modifier 301 compares the new interest with the list of deleted interests (and does not create an action in respect of deleted interests). In addition to strict comparison between incoming inputs 302 and deleted interests, the profile modifier 301 can access the lexicon WORDNET, or similar, in respect of the interests on the deleted list, comparing new requests with terms identified by WORDNET as being equivalent to deleted interests.

Interfacing Means 203

Interfacing means 203 controls the communication of information between the user U1 and the information provider 200. As shown in FIG. 1, the user U1 can, for example, communicate with the information provider 200 located on terminal T3 via any one of three Terminals T1, T2, and T4. Two of the Terminals T1, T2 can be arranged to send and receive data using WML (Terminals T1 and T2 having a Bluetooth emitting and receiving device respectively so that information that is received via terminal T1 can be received on terminal T2), and the third terminal T4 can be arranged to send and receive data using HTML. Each of the terminals T1, T2, T4 is capable of running web browsers. The user enters data via a form on the browser, in a known manner, in order to perform a number of actions, including (non-exhaustive list):

modifying interests comprising the user profile;
modifying the user's context;
viewing items pushed to the user; and
selecting items pushed to the user.

This form essentially captures any parameters entered by a user and transfers the captured parameters to other parts of the information provider 200 stored on the Terminal T3. For further information see "Client/Server Programming with Java and Corba", $2^{nd}$ Edition, R. Orfali and D, Harkey, pp. 239-242.

When the user U1 explicitly adds or deletes an interest from the user profile, the form posts the interests, together with the action that is to be performed in respect of that interest (e.g. add, delete), to the profiler 201, which processes this information as described above. The form can include drop down menus and the like to enable a user U1 to select from a predetermined list, which is especially useful for defining interests in films, food, etc. as the user U1 can select which film he is interested in, or type of food he is interested in.

Interfacing means 203 can alternatively or additionally be configured with means (not shown) to present at least part of the shortlist and/or interactions with the user U1 via a speech medium.

Index Generator 205

Index generator 205 creates an index for each information source stored on information source servers IS1-IS4, and stores the information in index tables on index database DB2. Each index table includes at least some of the following information:

1. The name of information source (e.g. name of a document).
2. Key terms that have been extracted from the information source.
3. The network address (URL) of the information source.
4. A locality record for the information source
5. Date and time that the information source was created.
6. Context object associated with information source—e.g. whether relevant to Work, Play, Home or Away etc. (optional).

A locality record is a location defined in latitude, longitude and altitude, and a three-dimensional shape defining the locality in which the record is valid, with the defined location at the centre of three-dimensional shape. Localities with which respective information sources are associated are individually configurable. Some information (for example weather information) could therefore be readily accessible by the user over a relatively wide area, whereas other information, being more location-specific (such as local services information), could be filtered out for all areas except in a narrowly defined locality.

The type of information indexed by Index generator 205 includes News data, stock market listings, Lycos, weather data, classified advertisements, event guides, entertainment information such as cinema listings, places to stay, places to eat, sport, financial information, shopping information e.g. store guides, and information on services e.g. cash point locations, petrol station locations. There are many methods for building indexes to unstructured information sources, and the particular method employed is unimportant for this embodiment. Thus, any means that is capable of retrieving and storing data in accordance with the index table defined above can be used (see "Managing Gigabytes" by Ian H. Witten, Alistair Moffat, Timothy C. Bell Morgan Kaufmann;

ISBN: 1558605703 for a comprehensive review of many methods currently employed in search and retrieval technology). The Index generator 205 accesses the information servers IS1-IS4 at regular intervals so that the index tables are up to date (daily, hourly, weekly, depending on the nature of the information source and the rate at which it changes).

Retrieval Engine 207

The function of retrieval engine 207 is to determine and instantiate the user's context in real-time, to retrieve interests associated with the instantiated context from the profiler 201 and to retrieve information from information sources IS1-IS4 via Index generator 205 based on those interests.

Figure 4:
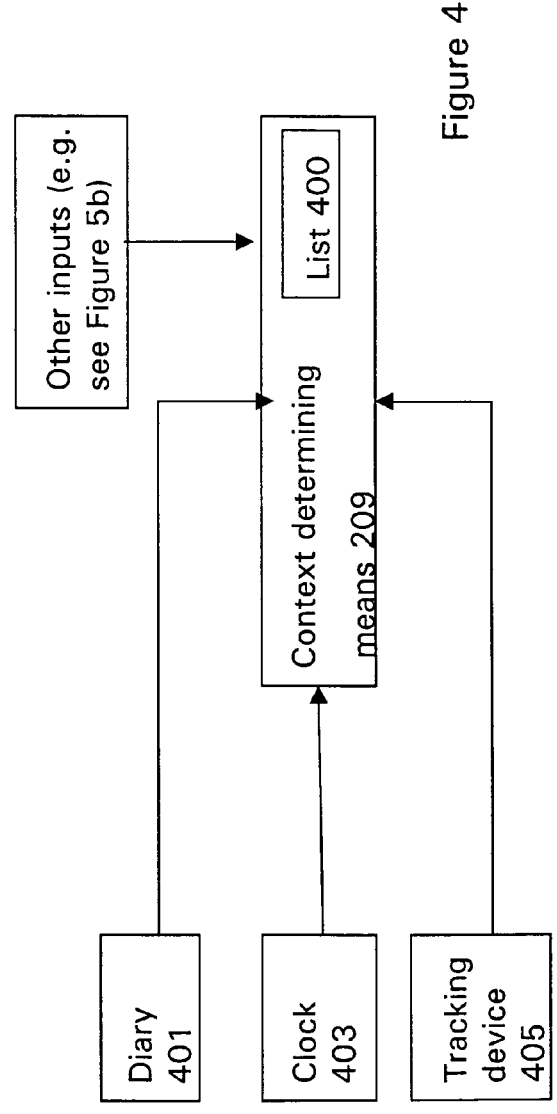
FIG. 4 is a schematic block diagram showing external inputs to a context determining means forming part of the apparatus of the information provider shown in FIG. 2.

The first stage—in which the retrieval engine 207 determines and instantiates the user's context—is performed by context-determining means 209 and is described with reference to FIG. 4 for the two contexts state and situation. Context-determining means 209 includes a configurable list 400 defining each of the context types—e.g. HOME can be defined by a location—as latitude and longitude values, and AWAY can be defined as any location more than n1 Km from home. Similarly, WORK can be defined by time of day and location, and PLAY can be defined by time of day and any location more than n2 Km from work. The Context-determining means 209 is arranged to receive input from several sources, e.g. a diary 401, a clock 403, and a personal tracking device 405, and to combine these inputs with information in the predetermined list so as to derive the context of the user U1. The examples shown in FIG. 4 are merely illustrative of the types of sources that can co-operate with Context-determining means 209 (more examples are given below).

The clock 403 could be a system clock, located on the Terminal T3. The diary 401 could be Microsoft Outlook™ calendar, or a custom built diary, to which the Context-determining means 209 can submit queries at predetermined times, requesting time-tagged data in respect of the user's planned actions. Information relating to interfacing with Outlook™ can be found in "Programming Microsoft Outlook and Microsoft Exchange" by Thomas Rizzo, Microsoft Press; ISBN: 0735605092. Entries in a diary 401 often include phrases, which require to be parsed into a format recognised by the Context-determining means 209; the diary 401 can be configured to interact with a parser and translate the entries accordingly.

The personal tracking device 405 is carried by the user U1 and enables his position within the communications environment to be tracked. For example, in this embodiment the tracking device 405 comprises a chip carrying card or "smart card" carrying data identifying the user, and some or all of the terminals T1-T5 carrying a card reader are arranged to read the card. Alternatively, it could comprise a 'smart badge' transponder, the location of which is tracked within the building. Specifically, the workstations T1-T4 and the cellular telephone T1 carry such smart card readers. Additional smart card readers are installed at access doors within the building, and are connected to the LAN N3 to signal thereon. Further, preferably, the cell phone T1 comprises, in addition to cell phone communicating components, a global positioning system (GPS) receiver and is arranged to derive and signal its position periodically as disclosed in EP 0467651 (Motorola). Alternatively, the cell phone T1 could perform positioning additionally using a land-based positioning signal, such as by differential GPS positioning, or purely using land-based positioning signals, such as differential GSM triangulation signals. As a further alternative, the user could enter his location manually.

Figure 5:
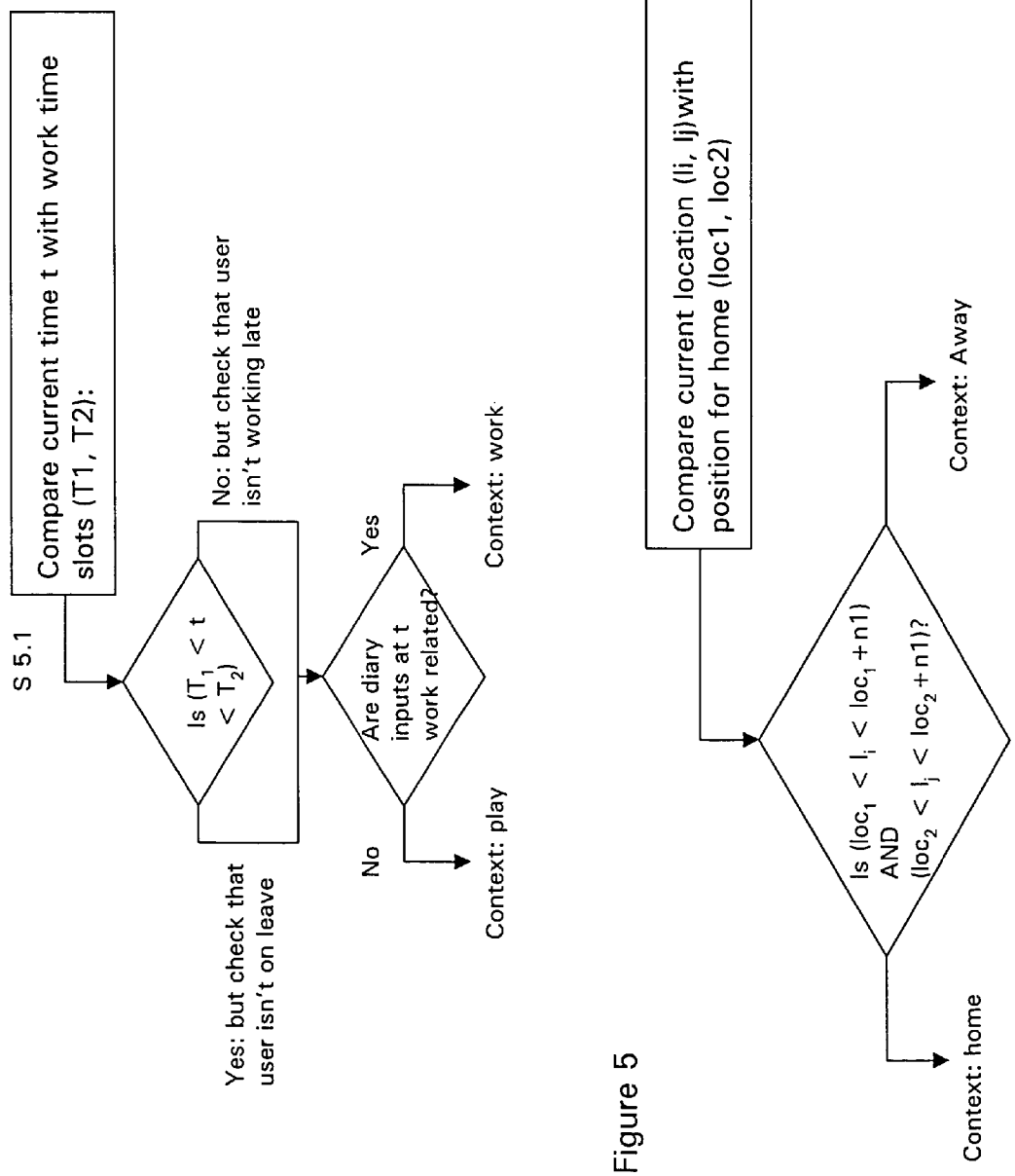
FIG. 5 is a schematic flow diagram showing steps involved in determining a user's context according to the present invention.

Once the Context-determining means 209 has gathered information from the diary 401, the clock 403 and the tracking device 405, and other such devices (not shown), this information is combined in order to instantiate the user's context. As an example, this process is defined with reference to FIG. 5 for the contexts work/play; home/away:

S 5.1 Take current time (t) and compare with time slots predefined for work (start time $T_1$, end time $T_2$, nominally applies to weekdays):
  i. If ($T_1$<t<$T_2$) and diary information work related: context WORK
  ii. If ($T_1$<t<$T_2$) and diary information play related: context PLAY (e.g. day on leave)
  iii. If (t<$T_1$ OR t>$T_2$) and diary information work related: context WORK (e.g. working in evening)
  iv. If (t<$T_1$ OR t>$T_2$) and diary information play related: context PLAY (i.e. evening free)

S 5.2 Transform position data into latitude and longitude ($l_i$, $l_j$) and compare with position for home ($loc_1$, $loc_2$):
  (i) If ($loc_1$<$l_i$<$loc_1$+n1) AND ($loc_2$<$l_j$<$loc_2$+n1): context HOME
  (ii) If ($l_i$>$loc_1$+n1) OR ($l_j$>$loc_2$+n1): context AWAY such that S 5.1 (i or iii) and S 5.2 (i) give WORK, HOME (W, H) as contexts S 5.1 (i or iii) and S 5.2 (ii) give WORK, AWAY (W, A) as contexts S 5.1 (ii or iv) and S 5.2 (i) give PLAY, HOME (P, H) as contexts S 5.1 (ii or iv) and S 5.2 (ii) give PLAY, AWAY (P, A) as contexts In another embodiment the personal tracking device 405 could comprise a network phone comprising a Digital Enhanced Cordless Telephone (DECT) and a mobile handset, where DECT phone is connected to the PSTN and the mobile handset to a GSM/GPRS/UMTS network. When the DECT phone detects a handset in range it takes the cell ID from the mobile handset and passes it over the fixed network to a server in the network, which includes context determining means 209. The message format may be SMS, DTMF or any other convenient standard. The handset could also contain a Bluetooth and or 802.11 Wireless Lan module, a digital off-air TV receiver and possibly a digital fixed or movie camera. If the DECT phone were located at the user's HOME location, then simply receiving a signal from the handset would indicate that the user were in the vicinity of HOME. Thus the context determining means 209 could be arranged so that if it receives any signal from DECT phone, then the user's context should be set to HOME. Alternatively, it could be arranged to receive a signal indicative of the cell ID of the mobile handset, and transpose that into lat and long, and used as described with reference to FIG. 5*a*.

Figure 5B:
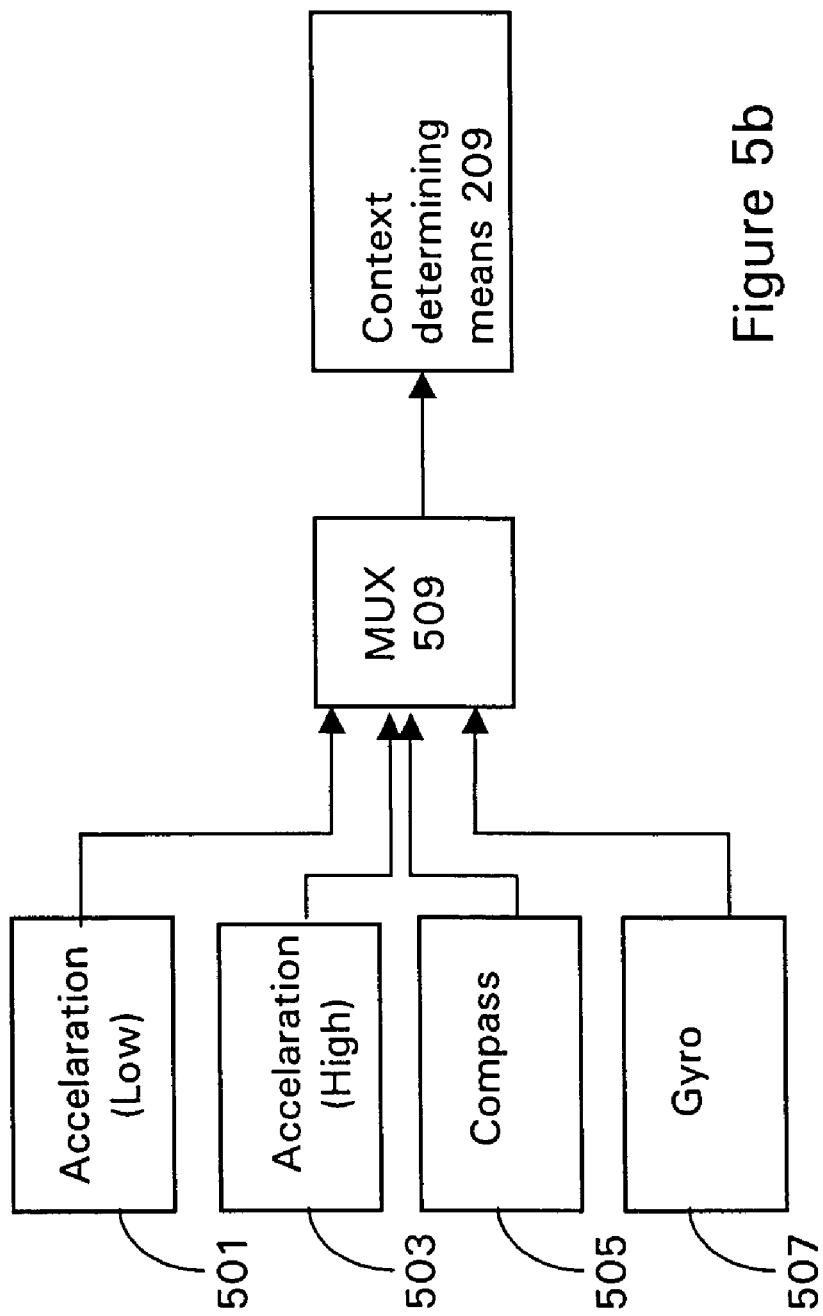
FIG. 5b is a schematic block diagram showing further external inputs to the context determining means shown in FIG. 4.

As described above, in addition to instantiating the context of the user with respect to state and situation, additional context information can be determined, for example, "outside", "windy", "raining", "stressed", "engaged", etc. Inputs from the devices listed at points 1-7 below, some of which are shown in FIG. 5*b*, may be used to identify this additional context information:

1. Information from the user: the user U1 can use a predetermined key, or sequence of keys, to indicate that he is distracted or on the move via terminal T1;
2. Weather information;

3. Light level detectors, such as Photovoltaic sensing devices available from Remote Measurement Systems 2633 Eastlake Ave E, Suite 20, Seattle Wash. 98102 (e.g. PVC-1 device)
4. Thermocouple sensors, such as temperature indicators available from TC Ltd (TC Ltd, P.O. Box 130, UXBRIDGE UB8 2YS, England)—to help determine whether the user U1 is outside or inside;
5. Input representative of stress levels—e.g. monitoring body temperature or interactions of the user with his terminal T1, T2, T4. Monitoring of user/terminal interaction is disclosed in the Applicant's published application WO00/25565 (IPD case ref A25709);
6. Input representative of Noise levels—can be determined by analysing the audio signal received via the audio input on the terminal T1;
7. Inputs from additional physical sensors, connected to the terminal T1 by a serial interface (not shown), including inputs from
    a low acceleration detector 501 (e.g. ADXL202, which measures acceleration of a low force in two directions);
    a high acceleration detector 503 (ACH04-08-05 available from Measurement Specialities Incorporated (which can be referenced via Universal Resource Locator (URL) http://www.msiusa.com on the Internet)) which measures acceleration of a high force in three directions;
    a direction detector 505 (e.g. a compass, HMC2003, available from Honeywell (referenced via URL http://www.ssechoneywell.com), which gives an absolute measurement of orientation of the terminal T1); and
    a direction and velocity detector 507 (using an ENC Piezoelectric Vibrating Gyroscope (part number S42E-2 which is sold under the registered trademark GYROSTAR) available from Murata manufacturing Company Ltd. (URL http://www.murata.com)). The acceleration, direction and velocity detectors may be connected via a multiplexer 509 (MUX) to the context-determining means 213.

The complex nature of the physical data makes the use of simple rules for determining the user's context from all of these inputs unreliable. Hidden Markov Models (HMM), or a Kalman Filter, can be used to determine more accurately the user's context when the instantiation of context is based on a combination of inputs 1-7. A good description of the mechanics and applications of Kalman Filters is provided by du Plessis, R. M., 1967; "*Poor man's explanation of Kalman Filters or How I stopped worrying and learned to love matrix inversion*".

The instantiated context may conveniently be expressed as a user context object, so that the Context-determining means 209 should therefore operate in "object-oriented" fashion; that is to say, context data should be "encapsulated" so as to be alterable only by associated control programs, acting in response to "messages" (which need not, however, be physically transmitted but could simply be data passed via the stack of a single computer). It will, however, be understood that the object oriented format is inessential to the invention.

As described briefly above, a context object comprises values, indicative of the determined context, for each of the possible context types. Thus, a user context object, for a user who is outside at the weekend where it is raining and windy, could comprise:

TABLE 2

| | |
|---|---|
| work/play | 0.7 (i.e. user more likely to be at play) |
| home/away | 0.0 (i.e. home and away are equally likely) |
| solo/group | 0.0 (i.e. solo and group are equally likely) |
| rainy/sunny | −0.7 (i.e. rainy conditions) |
| windy/calm | −0.6 (i.e. windy conditions) |

It will be appreciated that at certain times of day a user's context may change—e.g. at 09:00 the context changes from play to work. In terms of the user context object, for work/play, the weighting value will change crisply when the user goes to work in the morning (e.g. from 0.7 to −0.9). In some embodiments of the invention, a smoothing function can be applied to such crisp context transitions, essentially accounting for the fact that it may take some time for a user to mentally transist from play context into work context.

One example of a suitable smoothing function is a rate limited iterative convergence algorithm, which is a form of back propagation, described in "Artificial Intelligence—A Modern Approach" by S. Russell and P. Norvig, Prentice Hall, pp. 77-78:

$$l = \frac{\sum_{k=n}^{0} f(t+k)\cdot(n-k)}{\left(\frac{(n+1)n}{2}\right)}$$ Equation 1

$$w_{t+1} = w_t + (l-w_t)r$$ Equation 2 where $w_t$ is weight at time t, r is the rate of decay of the weight, n denotes size of a look-ahead time window, k represents a counter between 0 and n, t represents time from which a weight change should be computed, and l is a correction factor, which represents the difference between a previous and a current weight. As can be seen from equation 2, the effect of rate variable, r, is to damp the correction $(l-w_t)$ computed from equation 1. Variable k is preferably an integer that is incremented between 0 and n, so that the weight is varied between time t and time t+n. This equation could be applied to weights of one, or all of the context types in the user context object.

Conveniently, time t could be set to the time that the user's context was last recorded, and n could be set to the difference between t and the current time. This enables the current weights to be computed based on information relating to the user's previous context. Alternatively time t could be set to the current time, and n could be set to a specified number of hours from the current time. The context determining means 209 would evaluate the user's current context, and populate the user context accordingly. Equation 1 would then be applied to the weights in the user context object. In a further variant, the user could manually change his context—e.g. by manually modifying the weights in the user context object, so that context determining means would apply equation 1 with a predetermined look-ahead time window.

The skilled person would appreciate that values of r and n should be set in dependence on the type of context to which the weight applies: e.g. for work/play context type, the look-ahead time window should be chosen to reflect the shift from play to work mindset in the morning, and vice-versa in the afternoon.

As an alternative, fuzzy logic expressions could be used to describe the states prior to, and after, a change in context.

The second stage—in which the retrieval engine 207 retrieves interests associated with the user context object from the profiler 201—is performed by first retrieving means 211, which submits a request in respect of the user context object to the profiler 201. The profiler 201 queries the profile database DB1, which searches for interest context objects corresponding to the user context object. This search may involve plotting each of the context types in multi-dimensional space for the query context object, and finding an interest whose context object is a minimum (Euclidian) distance therefrom. Interests corresponding to those interest context objects identified from the profile database DB1, hereinafter referred to as "instantiated interests", are then passed to the second retrieving means 213.

Figure 6:
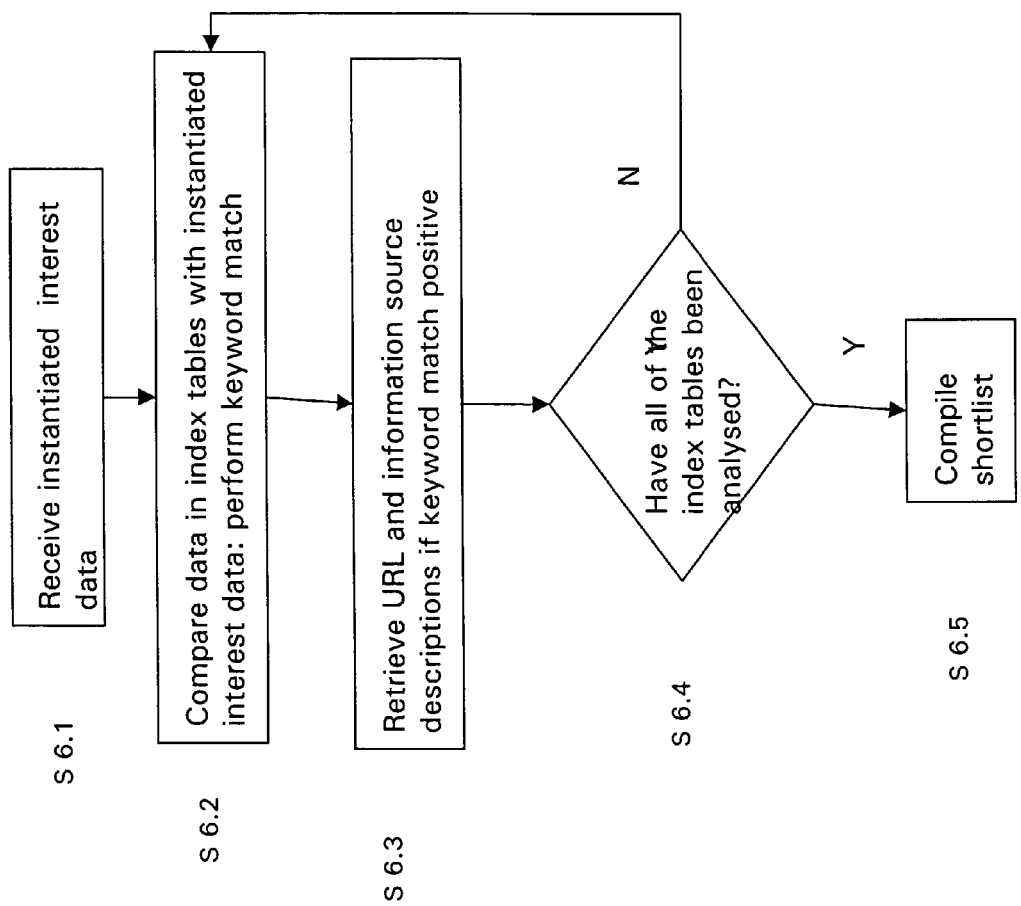
FIG. 6 is a schematic flow diagram showing steps carried out by second retrieving means forming part of the apparatus of the information provider shown in FIG. 2.

The third stage—in which the retrieval engine 207 retrieves information relevant to the instantiated interests—is performed by second retrieving means 213, which, referring to FIG. 6, performs the following steps:

S 6.1 Receives the interest data from first retrieving means 211;

S 6.2 Selects one of the index tables containing data relating to an information source, and checks for correspondence between instantiated interests and indexed keywords, e.g. using a key word match;

S 6.3 Retrieves network address (URL) and name of information source for positive key word matches;

S 6.4 Repeats S 6.2 and S 6.3 for all of the information sources that have been indexed by Index generator 205;

S 6.5 Compiles network address (URL) and name of the information sources that have been retrieved at S 6.3 into items on a shortlist.

In an alternative embodiment, first retrieving means 211 retrieves all of the user's interests, and performs steps S 6.1-S 6.5 as described above for all of the interests. Then, using the context object tagged to the interests, second retrieving means 213 ranks the items on the shortlist in accordance therewith (thus indirectly in accordance with the user's context). The items on the shortlist created at S 6.4 are then organised in accordance with the rankings, so that items that are most relevant to the user's instantiated context are placed at the top of the shortlist, and thus displayed to the user first.

When a significant volume of data is indexed, e.g. around 2 Gigabytes or more of data, the capabilities of current hardware mean that data is likely to be retrieved in respect of instantiated interests. In this case, the second retrieving means 213 can be arranged to retrieve information relating to interests other than the instantiated interests at a later (predetermined) time.

As a further alternative, the second retrieving means 213 can perform an additional step S 6.1.1 (not shown) of comparing the user context object with the index entry corresponding to context object associated with the information source (number 6. under "Index Generator"). If the context objects do not match, the retrieving means 213 moves onto the next information source without carrying out step S 6.2, which has the advantage of minimising the processing load involved in retrieving information. This step is also advantageous for the user: consider an example where information sources relating to hotels have a weight of 1.0 for the attribute home/away in their context object. In this embodiment, the second retrieving means 213 will only access information relating to hotels if the user's context object indicates that the user is away.

The shortlist can be stored in the database DB1, and shortlist page views are created (e.g. HTML/WML page views are created comprising shortlist data) for delivery to the user U1 via interfacing means 203.

Interfacing means 203 can be arranged to receive the shortlist page views from the database DB1 at predetermined intervals, and to post that data for display on the user's Terminal T1, T2, T4. In one arrangement the shortlist page views are requested from the second retrieving means 213, and passed from the second retrieving means 213 to the interfacing means 203. As stated earlier, items that rank the highest are displayed at the top of the list. The user U1 can select any of the items on the shortlist, and this selection is posted to second retrieving means 213, which sends a request for data to the URL in the item. Data returned from the URL is then displayed to the user U1.

In some instances, the instantiated context of the user U1 may indicate that the user U1 is not disposed to receive information. For example, the user U1 could be travelling, in a meeting, tired, in a badly lit environment etc., in which case responding to the information is difficult. In these situations, the second retrieving means 213 can withhold sending information until the user's context is determined to be more suited to receiving information. The second retrieving means 213 is therefore arranged to receive inputs from the context-determining means 209 that are representative of the user's instantiated context, and compare these with predetermined information providing rules, such as IF (Context=tired) OR (Context=Away) OR (Context=Low light) OR (Context includes travelling) etc.

THEN (Set a timer (X mins) to check for context after X mins) where X is predefined ELSE (Send information to user)

Clearly other forms of rules are possible.

Adaption of Profile:

The embodiment presented above describes ranking items on a user's shortlist in accordance with the user's instantiated context, so that items relating to instantiated interests are presented to the user U1 first. In addition to the context information, preference attributes such as relevance, importance, etc. (described above) are also factored into the ranking process. However, it may be that the user U1 habitually ignores information relating to a particular interest (this is particularly possible for interests that have been derived implicitly based on rules (see example below)).

Figure 7:
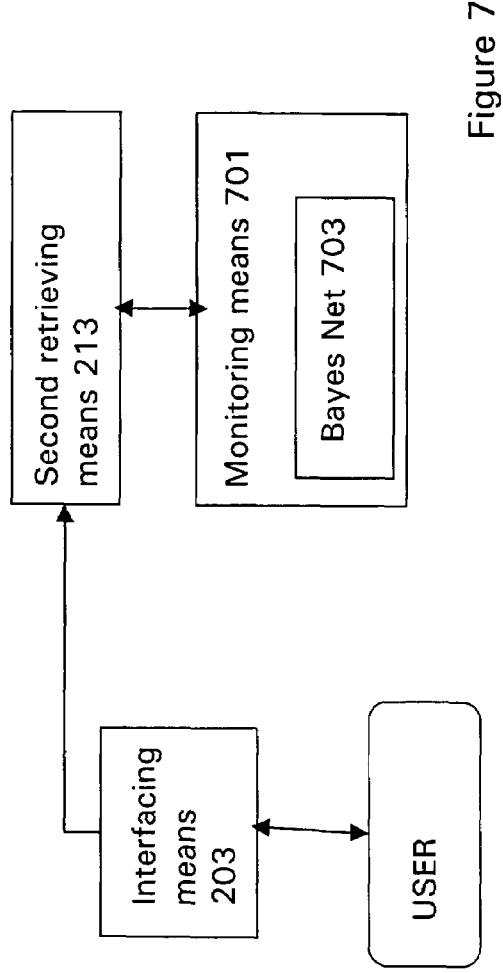
FIG. 7 is a schematic block diagram showing the second retrieving means of the information provider of FIG. 2 co-operating with a monitoring means component.
Figure 8:
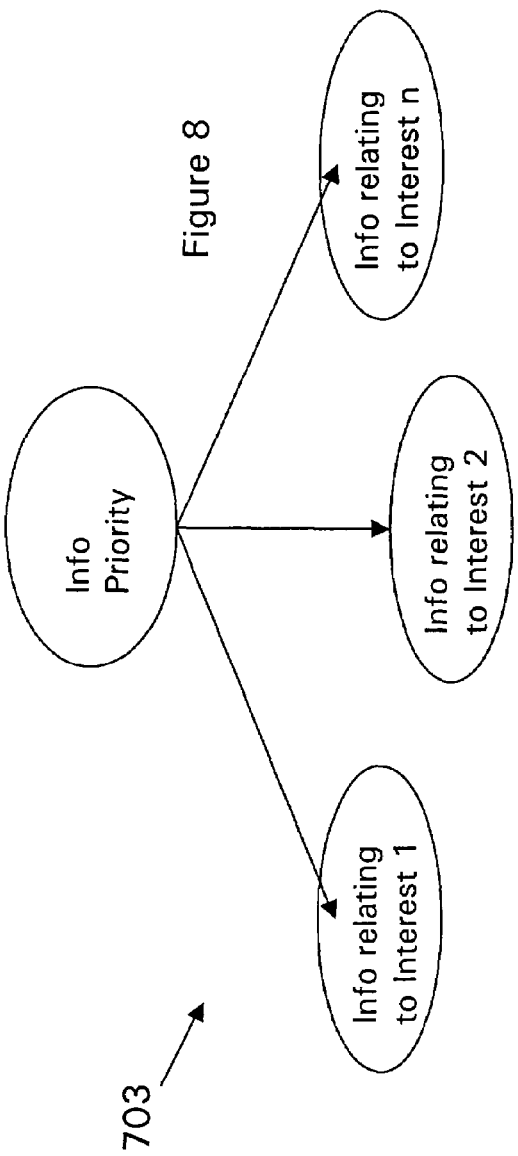
FIG. 8 is a schematic diagram showing a Bayes net forming part of the monitoring means component.

As shown in FIG. 7, the information provider 200 can further include monitoring means 701 for observing the way in which the user U1 accesses items on the shortlist, and adapting attributes of the user's interests accordingly. Preferably the monitoring means 701 includes a Bayes net 703 and co-operates with the second retrieving means 213. Items on the shortlist are input to the Bayes net 703, shown in FIG. 8, to compute a priority associated with interests corresponding to those items. As known in the art, a Bayes net considers the causal relation of history data in order to modify the a-priori probability of the occurrence of an event. A discussion of Bayes nets is given in "Artificial Intelligence—A Modern Approach" by S. Russell and P. Norvig, Prentice Hall, USA.

The Bayes net 703 is operable to adapt the preference attributes, based on how the user U1 is observed to deal with items on the shortlist. For example, items that are placed high up the shortlist suggest that the information source is relevant to the user. In practice, however, the user may choose to access information relating to that interest later in the day. If that is the case, the monitoring means 701 uses the Bayes net 703 to modify the preference attributes, such that the next time an item relating to the interest appears on the shortlist, the monitoring means 701 can anticipate how the user U1 will want to deal with it, and factor this into the ranking of the interest accordingly.

In addition to implicitly adapting the user's profile as described above, the second retrieving means 213 can be further arranged to receive information from the profile modifier 301. As described above, profile modifier 301 can push questions out to the user U1, requesting explicit rating of information sources—e.g. the user U1 could be presented with ratings from −2 to +2, and asked to indicate how relevant a particular information source was to them. In general, if a user returns a high score, second retrieving means 213 lowers the threshold of the relevance preference attribute in respect of interests that relate to that information source; conversely, if the user returns a low score, second retrieving means 213 increases the relevance threshold.

If a user continually assigns a low score to information sources that have been identified for an interest, this could indicate that the keywords associated with the interest need modifying. The system administrator would either perform modification of keywords explicitly, or the user could be prompted to suggest some keywords. The user's response to the modified keywords could be monitored by the feedback, providing a means of improving the quality of the keywords in respect of an interest.

Data Storage

The information provider 200 is capable of providing information for many users, and a shortlist page view is generated for each user, on a per-user basis, every time the user requests information (automatically or manually). This places significant loads on various components of the information provider 200, which can be reduced by caching data. The objective is to create pages, which are to be viewed by users, on the cache once only (i.e. request data from its stored location once only), so that any subsequent request for the page can be delivered from the cache. This shortens the request-response chain, improves response time, and reduces network load.

Several caching arrangements are used:

1. The items on the shortest for each user is cached.

The items on the shortlist for each user U1 are preferably post-processed by second retrieving means 213 to remove duplicates, and, as described above, are ranked in accordance with the user's instantiated context prior to storing in the database DB1. Typically, there will be a considerable number of items on the shortlist, but only a selection can be displayed to the user at any one time due to terminal display constraints. Thus the items on the shortlist need to be cached in a content cache (not shown), which can be provided by storage on the database DB1, so that the post-processing described above does not have to be performed for each selection of items that is displayed to the user.

2. The page views comprising items on the shortest are cached.

As described above, the page views comprising the shortlist data are typically created using WML/HTML (although other formats are possible, see later). If the type 2 cache described above is used, WML/HTML pages will populate a page view using input from the content cache. These page views are retrieved using HTTP, which is a request-response type of protocol—in its simplest configuration a client application, here the retrieving means 213, sends a request to a server, here the index generator 205, and then the index generator 205 responds to the request by retrieving data from the content cache and sending it to the second retrieving means 213. In this configuration (not shown), there is a cache as an intermediary, such that the retrieving means 213 makes its request to the cache (e.g. a request for a page view showing the shortlist) instead of to the index generator 205. The cache then makes the request to the index generator 205 on behalf of the retrieving means 213. The index generator 205 replies to the cache, and then the cache relays this to the retrieving means 213 (which passes the information on to the interfacing means 203). Each page view should obey the HTTP 1.1 caching rules (see "Illustrated guide to HTTP", Paul Hethmon, Manning Publications Co. or RFC 2616 Hypertext Transfer Protocol—HTTP/1.1. R. Fielding, J. Gettys, J. Mogul, H. Frystyk, L. Masinter, P. Leach, T. Berners-Lee. June 1999. (Format: TXT=422317, PS=5529857, PDF=550558 bytes) (Obsoletes RFC2068) (Updated by RFC2817) (Status: DRAFT STANDARD)); in particular the following must be included in the response header of the page views:

(i) Expiry header, with HTTP date;
(ii) Cache-control: max-age=sec tag, stating lifetime of the content;
(iii) Content-length response header (which also allows persistent connections)

In one arrangement, the network address (URL, item 3 in the index table) is pre-appended with the user's session ID, and changes to the session ID, such as changes to the user profile, updates to information sources etc. are used to control operation of the cache (when a user's profile is modified (e.g. an interest is added) then the cached page views are out of date (because the content populating the page view is out of date); to prevent these old pages being sent to the user U1, the session ID changes). Thus once the session ID changes, the cache is triggered to request new data from the index generator 205 (which retrieves data from the content cache if the type 1 cache is being used).

3. The results of the queries for all users are cached.

It is possible that, where there are a large number of users, some of the interests will overlap—i.e. User U1 will have some interests that are identical to the interests of user U2 (even though the context object tagged to the interest may vary between users), and it would therefore be inefficient to perform the same query a number of times.

Consider performing a query—in respect of interests I1 . . . In—for user U1 (assume that this query has not been performed before).

In accordance with FIG. 6, second retrieving means 213 retrieves (step S6.3) URL and information source names corresponding to information sources that are relevant to the user's instantiated context. This is stored in a query cache (not shown).

Keywords relating to the interests I1 . . . In are hashed, saved e.g. in a file or similar, and linked to the respective identifiers in the query cache.

When a new query arrives in respect of interests J1 . . . Jn (e.g. for user U2), the corresponding keywords are compared with the hashed keywords to identify whether a query has already been processed in respect of those interests.

If so:
second retrieving means 213 does not have to perform a query in respect of interests J1 . . . Jn, and
interests J1 . . . Jn are linked to the identified items in the query cache.

Queries could be monitored for their time of request and degree of commonality across the user community, so that queries in respect of requests that are determined to occur frequently, and within a particular time interval, could be automatically performed at a predetermined time.

Additional Details and Modifications

Context Changes:

In the above description, the context of the user U1 is determined by context-determining means 209, and this information is used to arrange the data on the shortlist. However, it may be that the user U1 wishes to view information relating to a context other than his present one. For example, if the user U1 is at work, he may wish to see news relating to his football team, Startreck United. The interest football is likely to be accompanied by the contexts Play, Home or Play, Away. Assuming the information provider 200 is arranged to retrieve information relating to the user's instantiated context only, the user U1 has to explicitly change the context in order to view this information. The form displayed on the browsers (on any of the terminals T1, T2, T4) thus includes means for entering a request for change of contex—either by entering a time, from which a context will be derived, or by explicitly entering the new context. When this form is posted by interfacing means 203, as described above, the new context information is sent to the first retrieving means 211, and inputs from the context-determining means 209 are disabled.

Categorising Types of Users:

When a user U1 first subscribes to the system, the form presented to the user U1 on his browser can include a plurality of drop down menus and lists comprising interests selectable by the user. As an alternative, or in addition, the form can include descriptions of types of users, and the user U1 can indicate which type of user he is. For example, there may be several boots buttons:

Slippers button
Stiletto button
Trendy trainers button
Walking boot button
Cowboy boot button etc.
Cowboy boot button etc.

Each of these buttons has a pre-configured list of interests appended thereto, and, upon selection of one of the buttons, all of the respective interests will be assigned to the user U1.

As an additional or alternative use for the buttons, the user U1 is prompted to select which of these buttons best represents them. The profiler 201 can be arranged to maintain lists of users against type of button and perform some sort of collaborative filtering and implicit filtering of interest data between similar types of users.

Format of Data:

The information may be summarised and delivered, and optimised to, a variety of formats/devices. The formats included, but are not limited to, HTML, WML, I-mode (cHTML), VxML, XML, Postscript, PDF. The devices include but are not limited to PCs, mobile phones, PDAs, other communications devices, games consoles, set-top boxes, multi-media kiosks, wearable computers, FAX and printed hardcopy.

The information may be delivered on demand or alerted to the user U1. The alerting may use a number of mechanisms including but not limited to email, Internet Push services, SMS, WAP Push services, Voice.

The indexing of data by Index generator 205 includes both local and remote sources held in formats including, but not limited to, XML, HTML, WML, CHTML, plain text, RTF and speech.

The networks over which data is transmitted further includes UMTS, GPRS packet switched mobile networks.

Example of Implicit Adaption of Profile: Traffic Information

Assume that the user U1 has explicitly specified an interest in motorsport, transport and cars etc. for contexts Work and Home, and the profiler 201 includes a rule that states "If a user has an interest in motor vehicles, include an interest in traffic reports". In accordance with the description above, the user's profile will be modified to include the interest traffic. Assume further that the information provider 200 is arranged to automatically send the user U1 data at 08:30 every day. The context determining means 209 determines that the user is on his way to work (inputs from the tracking device 405 indicate that the user is moving, and that the movement is taking the user U1 closer to work and further from home; inputs from the diary and clock 401, 403 confirm that the user is on his way to work). The first retrieving means 211 retrieves information from the user's profile relating to his instantiated context, and passes this information to the second retrieving means 213, which compiles a shortlist of information sources relevant to the user's interests, and sends the shortlist to retrieval engine 701 and to the user's terminal T1. As the traffic interest is relevant to the user's current context, the ranking associated with the traffic interest is likely to be high, and thus the interest appears relatively high up the shortlist. However, assume that the user chooses to ignore the traffic interest: the Bayes net 703 modifies the preference weight associated with traffic, such that the next day (assuming the user is determined to be in same context) this modified preference weight will be applied and the interest is likely to appear further down the list (the actual position depending on the degree to which the weight is modified).

The degree to which the preference weight is modified can depend on the number of days an interest is ignored, so that some sort of time dependent function is applied to calculate the weight.

Aspects of the information provider 200, in particular the profile information stored on database DB1, may be operated behind a firewall, so that external parties cannot gain access to profile information. Alternatively the whole system could be run from within an intranet, or a secure network environment, such that the only communication with external systems is to receive updated information sources, for indexing purposes, and to communicate with a mobile user.

As will be understood by those skilled in the art, the invention described above may be embodied in one or more computer programs. These programmes can be contained on various transmission and/or storage mediums such as a floppy disc, CD-ROM, or magnetic tape so that the programmes can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to". The words "X including Y" and the like are to be construed as indicating that X has at least Y, but that X most likely has other elements in addition to Y.

What is claimed is:

1. A method of selecting information sources in accordance with a subject matter of relevance to a user, the subject matter being identifiable by a plurality of sets of subject-related data, each set having an indication of at least one context in which the set is relevant to the user, the method comprising:
   (i) receiving schedule information and data in respect of at least one environmental condition associated with the user so as to identify a user context,
   (ii) searching the sets of subject-related data in accordance with a predetermined relationship between the identified user context and said indication of context so as to select subject-related data relevant to the identified user context,
   (iii) generating a list of information sources based on the select sets of subject-related data, and
   (iv) transmitting said list to a terminal associated with said user so as to allow said user to select an information source and thereby to access information from said source;
   wherein the receiving steps includes:
   tracking the location of a user by receipt of tracking information for the user, and comparing the tracking information with a predetermined location information in accordance with predetermined criteria, the predetermined location information defining at least a "home" context and a "work" context, and the predetermined criteria including conditions between the tracking information and the predetermined location information.

2. A method according to claim 1, in which the predetermined relationship between at least some of the identified contexts and said indication of context includes a correspondence therebetween.

3. A method according to claim 2, in which, when the correspondence is null, the selected sets of subject-related data are all of the sets of subject-related data, and said generating step (iii) includes:
   retrieving information sources in accordance with the selected sets of subject-related data,
   tagging the retrieved information sources with the context indicated against the corresponding set of subject-related data,
   ranking said tagged information sources, at least on part, in accordance with correspondence between the identified context of the user and the tagged context, and
   compiling a list comprising the tagged information sources, the rankings associated therewith determining positions of the tagged information sources on the list.

4. A method according to claim 3, further including the steps of:
   monitoring the selection of at least one information source on the list by the user, in order to determine a relevance weight for each information source, and for each information source on the list,
   identifying the set of subject-related data corresponding thereto,
   allocating the relevance weight to the identified set of subject-related data, such that any ranking of tagged information sources is also performed in accordance with the allocated relevance weight.

5. A method according to claim 4, in which the monitoring step includes, at least in part, utilizing a Bayes Net in respect of each information source.

6. A method according to claim 2, in which, when there is identical correspondence between at least some of the identified contexts and said indication of context, said generating step (iii) includes:
   retrieving information sources in accordance with the selected subject-related data, and
   compiling a list comprising the retrieved information sources.

7. A method according to claim 1, in which the context of the user to be identified is the current context of the user.

8. A method according to claim 1 in which said subject-related data comprises keywords.

9. A method according to claim 1, in which the transmitting step (iv) comprises:
   inputting the identified user context to at least one predetermined transmission condition,
   processing each transmission condition,
   and if the transmission conditions are deemed to be satisfied, transmitting the list.

10. A method according to claim 9, in which the at least one transmission condition includes one or more rules for determining whether the user is disposed to receive information.

11. A method according to claim 1, in which information relating to said selected information sources is provided to a user via a communications system.

12. A method according to claim 1, in which a plurality of user contexts is identified in respect of the user.

13. A method according to claim 12, in which each of the plurality of contexts is weighted, each respective weight being indicative of the likelihood of a user being in the associated respective context.

14. A method according to claim 13, including predicting, on the basis of the identified context, a future context of the user.

15. A method according to claim 14, in which the predicting step includes applying a smoothing function (Equation 1) to at least some of said weights, thereby changing the user's context.

16. The method according to claim 1, in which the receiving step includes:
   tracking the location of a user by receipt of tracking information for the user, and
   comparing the tracking information with a predetermined location information in accordance with predetermined criteria, the predetermined location information defining at least a "home" context and a "work" context, and the predetermined criteria including conditions between the tracking information and the predetermined location information.

17. A method according to claim 16 in which the predetermined criteria used in the comparing step includes conditions relating to the received schedule information.

18. The method of claim 1 of selecting information sources in accordance with a subject matter of relevance to a user, the subject matter being identifiable by a plurality of sets of subject-related data, each set having an indication of at least one context in which the set is relevant to the user, the method comprising:
   (i) receiving schedule information and data in respect of at least one environmental condition associated with the user so as to identify a user context,
   (ii) searching the sets of subject-related data in accordance with a predetermined relationship between the identified user context and said indication of context so as to select subject-related data relevant to the identified user context,
   (iii) generating a list of information sources based on the select sets of subject-related data, and (iv) transmitting said list to a terminal associated with said user so as to allow said user to select an information source and thereby to access information from said source;
including receiving data from at least one of a position detector, an acceleration detector, stress detecting means, a temperature detector, light level detecting means.

19. A method of storing information in respect of subject matter of interest to a user on the basis of a state of the user, wherein the subject matter of interest includes a plurality of sets of keywords, each set of keywords having at least one identifiable state of the user and/or environment allocated thereto, the method including:
(i) selecting information sources, in accordance with a subject matter of relevance to a user, the subject matter being identifiable by a plurality of sets of subject-related data, each set having an indication of at least one context in which the set is relevant to the user, the method comprising:
(a) receiving schedule information and data in respect of at least one environmental condition associated with the user so as to identify a user context,
(b) searching the sets of subject-related data in accordance with a predetermined relationship between the identified user context and said indication of context so as to select subject-related data relevant to the identified user context,
(c) generating a list of information sources on the select sets of subject-related data, and
(d) transmitting said list to a terminal associated with said user so as to allow said user to select an information source and thereby to access information from said source;
wherein the receiving step includes:
tracking the location of a user by receipt of tracking information for the user, and comparing the tracking information with a predetermined location information in accordance with predetermined criteria, the predetermined location information defining at least a "home" context and a "work" context, and the predetermined criteria including conditions between the tracking information and the predetermined location information;
(ii) organizing the selected information sources in accordance with a plurality of criteria, at least one of which includes the identified state of the user or the environment, and
(iii) storing the organized information.

20. A method according to claim 19 including presenting the retrieved information to the user via a terminal, said presentation of information including creating a viewable page comprising at least some of the retrieved information, such that when a viewable page is created, a selection of said stored information is retrieved in accordance with display capabilities of the terminal.

21. A method of selecting information sources in accordance with a subject matter of relevance to a user, the subject matter being identifiable by a plurality of sets of subject-related data, each set being stored once only and having an indication of a plurality of contexts in which the set is relevant to the user, the method comprising:
(i) receiving schedule information and data in respect of at least one environmental condition associated with the user so as to identify a user context associated therewith,
(ii) searching the sets of subject-related data in accordance with a predetermined relationship between the identified user context and said indication of context so as to select subject-related data relevant to the identified user context,
(iii) identifying information sources based on the selected sets of keywords;
wherein said receiving step includes:
tracking the location of a user by receipt of tracking information for the user, and comparing the tracking information with predetermined location information in accordance with predetermined criteria, the predetermined location information defining at least a "home" context and a "work" context, and the predetermined criteria including conditions between the tracking information and the predetermined location information.

22. A method according to claim 21, in which the context of the user to be identified is the current context of the user.

23. The method according to claim 21, in which the receiving step includes:
tracking the location of a user by receipt of tracking information for the user, and
comparing the tracking information with predetermined location information in accordance with predetermined criteria, the predetermined location information defining at least a "home" context and a "work" context, and the predetermined criteria including conditions between the tracking information and the predetermined location information.

24. A tangible storage medium containing computer program, or a suite of computer programs, comprising a set of instructions to cause a computer, or a suite of computers, to perform the method steps according to claim 1.

25. Apparatus for selecting information sources in accordance with a subject matter of relevance to a user, the subject matter being identifiable by a plurality of sets of subject-related data, each set having an indication of at least one context in which the set is relevant to the user, the apparatus comprising:
location storage means arranged to store data indicating context in which information from the respective sources is deemed to be relevant, identifying means arranged to receive a signal indicative of schedule information and data in respect of at least one environmental condition associated with the user so as to identify a user context associated therewith; context-dependent selection means arranged to identify, from said information sources, a plurality of information sources on the basis of the identified context of the user and said stored context data; and
generate a shortlist of said identified information sources, and transmitting means for transmitting the shortlist to a terminal in said telecommunications system for receipt by a user;
wherein said identifying means is arranged to:
track the location of a user by receipt of tracking information for the user, and compare the tracking information with predetermined location information in accordance with predetermined criteria, the predetermined location information defining at least a "home" context and a "work" context, and the predetermined criteria including conditions between the tracking information and the predetermined location information.

26. Apparatus according to claim 25, wherein the identifying means is arranged to process a plurality of rules dependent on the received signal indicative of schedule information and data in respect of at least one environmental condition, the rules generating, as output, data identifying one or more contexts.

27. Apparatus according to claim 25, in which each set of subject-related data is stored once only, and has an indication of a plurality of contexts in which the set is relevant to the user.

28. The apparatus of claim 25, wherein said identifying means is arranged to:

track the location of a user by receipt of tracking information for the user, and compare the tracking information with predetermined location information in accordance with predetermined criteria, the predetermined location information defining at least a "home" context and a "work" context, and the predetermined criteria including conditions between the tracking information and the predetermined location information.

* * * * *